United States Patent [19]
White

[11] 4,022,501
[45] May 10, 1977

[54] KNOTTER MECHANISM BILL HOOK

[75] Inventor: Allen A. White, Peabody, Kans.

[73] Assignee: Hesston Corporation, Hesston, Kans.

[22] Filed: Aug. 2, 1976

[21] Appl. No.: 710,718

[52] U.S. Cl. ............................................. 289/11
[51] Int. Cl.² ..................................... B65H 69/04
[58] Field of Search ........................... 289/5, 8, 11

[56] References Cited
UNITED STATES PATENTS

| 284,430 | 9/1883 | Jewett | 289/11 |
| 796,926 | 8/1905 | McElroy | 289/11 |
| 983,922 | 2/1911 | Moore | 289/11 |
| 1,176,216 | 3/1916 | Hanson | 289/11 |
| 1,523,471 | 1/1925 | Benjamin | 289/11 |
| 3,101,963 | 8/1963 | Sullivan et al. | 289/11 |

Primary Examiner—Louis K. Rimrodt
Attorney, Agent, or Firm—Schmidt, Johnson, Hovey & Williams

[57] ABSTRACT

The stationary, lower jaw of the rotary bill hook has a transversely bulbous toe at its forward end that protrudes laterally outwardly in opposite directions from the longitudinal axis of the jaw. A laterally constricted neck immediately behind the toe retains strands looped around the hook during knot tying, and although the toe is bulbous, the jaw is so contoured that its circumference from the neck to the forwardmost edge of the toe does not exceed the circumference at the neck. As a result, a small, tight knot can be made without accidentally enlarging and loosening the same as it is stripped from the bill hook. The forwardly converging relationship of the upper and lower surfaces of the stationary jaw, together with an oblique relationship of the bulbous toe to the longitudinal axis of the jaw, provide the desired circumferential relationship. A ledge is presented by the protrusion on the trailing side of the jaw to support the pigtail ends of the strands as the knot is stripped from the bill hook, and the leading side of the jaw is longitudinally concave from the leading protrusion rearwardly to the neck so as to urge the strands rearwardly to the neck during the tying operation.

4 Claims, 10 Drawing Figures

KNOTTER MECHANISM BILL HOOK

This invention relates to knotting mechanism such as that used on crop baling equipment to tie a knot in the opposite ends of a strand of twine looped around the bale. More particularly, this invention relates to improvements in the configuration of the rotary bill hook which normally forms a part of such mechanism.

In a typical knotting mechanism the bill hook wraps a pair of side-by-side strands around itself while tension is maintained on the strands by an adjacent device which grips and retains the free ends of the strands. After the hook has looped the strands about itself, its swingable jaw clamps a portion of the ends against a stationary jaw of the hook, they are severed from the holding device, and the loop is stripped off the hook over the clamped "pigtail" ends to transform the loop into a secure knot. However, with the advent of larger diameter twine stands utilizing synthetic fibers instead of the natural fibers heretofore prevalent, problems have developed in achieving a tight knot that can be rapidly and, without failure in every instance, properly stripped over the retained pigtail ends.

Consequently, the knots may not be formed at all such that the compacted bale is held by fewer than the requisite number of tied strands or, at best, the knots may be so loose that they can be easily pulled apart while the bales are being handled for storage and other purposes, either of which is highly undesirable. Such malfunctioning is especially prevalent if the strands are tied under conditions of high tension necessitated by the higher than conventional density of bales with which the twine may be used.

Accordingly, one important object of the present invention is to provide an improved bill hook design which will produce reliable, trouble-free knot tying even if larger than normal diameter synthetic twines are used under conditions of high tension.

Pursuant to the foregoing, another important object of this invention is to provide a bill hook design wherein the loop which is wrapped about the bill hook during rotation of the latter is encouraged to remain well seated around the knot-tying crotch of the hook to avoid the unintentional accumulation of unwanted portions of the strands beneath the clamping jaw of the hook, such accumulation otherwise obstructing the free stripping of the loop over the clamped pigtail ends of the strands and, thus, preventing the formation of the knot.

An additional important object of this invention is to provide a bill hook configuration which effectively "cams out" the strand loop as it is stripped over the retained pigtail ends following their severance, such as to facilitate movement of the loop over the pigtail ends.

Yet a further important object of this invention is to accomplish the free stripping action of the immediately foregoing object without enlarging the diameter of the entire loop as it is stripped over the pigtail ends, thereby, in the end, accomplishing smooth, trouble-free knotting without sacrificing knot strength, tightness, speed of operation, or minimum twine wastage.

Figure 8:
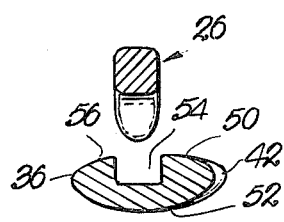
Figure 9:
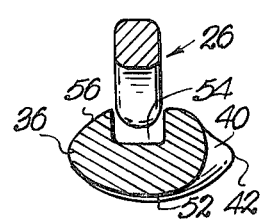
Figure 7:
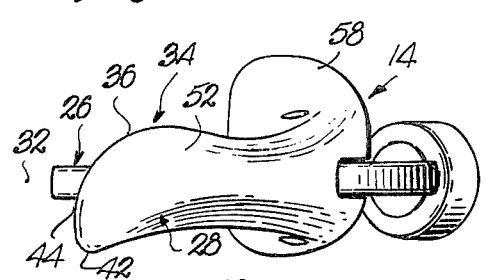
FIG. 7 is a bottom plan view thereof.
Figure 10:
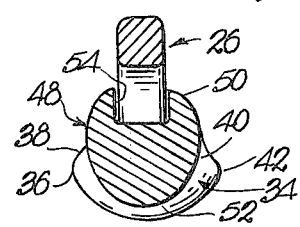

FIGS. 8, 9 and 10 are cross-sectional views of the hook taken along lines 8—8, 9—9 and 10—10, respectively.

One example of a bill hook design having some degree of resemblance to that of the present invention is shown in U.S. Pat. No. 3,468,575, in the name of Grillot, issued Sept. 23, 1969.

Figure 1:
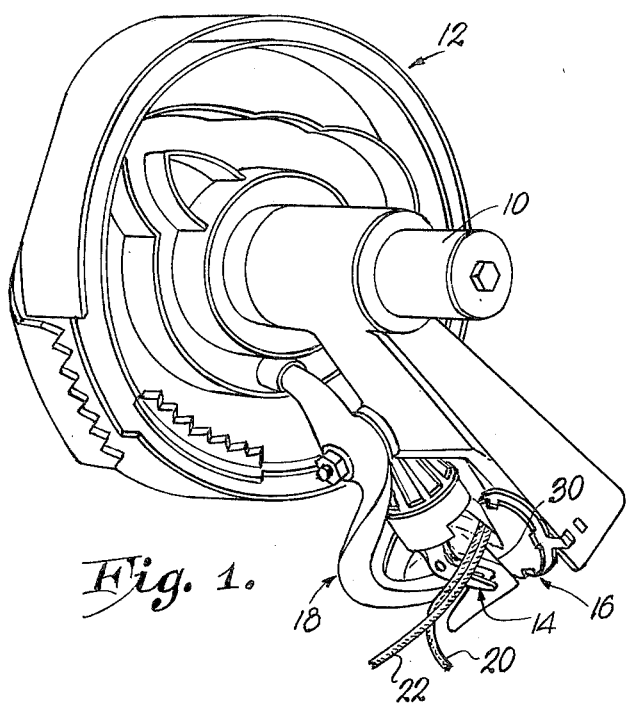
FIG. 1 is a front perspective view of knotting mechanism which incorporates a bill hook constructed in accordance with the principles of the present invention.
Figure 2:
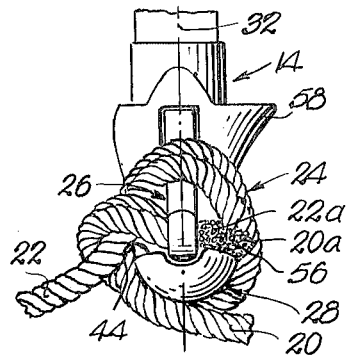
FIG. 2 is an enlarged front elevational view of the hook in the latter stages of knot formation, illustrating the manner in which the severed pigtail ends of the strands are supported on a trailing ledge of the hook and the loop is destined to be cammed out around such pigtail ends as the loop is stripped off the hook.

The knotting mechanism illustrated in FIG. 1 includes a drive shaft 10 which, when actuated, rotates a cam 12 to operate a bill hook 14, a twine holding device 16, and a stripping arm 18, all in a conventional manner which need not be described in detail. Suffice it to point out that after a pair of twine strands 20 and 22 become stretched across the hook 14 and retained by the device 16, the hook 14 is rotated clockwise by the cam 12 so as to become enveloped by a loop of the strands, as illustrated in FIG. 2, the loop in that Figure being designated by the numeral 24. During such rotation of the hook 14, its movable or swingable jaw 26 is opened by structure, not illustrated, to receive and subsequently clamp against the stationary jaw 28 the pigtail ends 20a and 22a of the strands 20 and 22 respectively. The pigtail ends 20a and 22a become severed from the device 16 in the latter stages of the tying cycle by a knife edge 30 on the arm 18 as the latter is operated by the cam 12. Such swinging of the arm 18 also serves to strip the loop 24 off the hook 14 from left to right viewing FIG. 1, and since the pigtail ends 20a and 22a are clamped tightly by the jaw 26, the ends 20a and 22a become pulled through the loop 24 to form the knot.

The stationary jaw 28 has an arcuate, longitudinal axis 32 (when viewed in side elevation) that extends forwardly from the pivot 33 which interconnects the jaws 26 and 28. The normally forwardmost portion or toe 34 of the stationary jaw 28 is transversely bulbous, having a first protrusion 36 on the trailing side 38 of the jaw 28 (with respect to its direction of rotation) that projects laterally outwardly from the longitudinal axis 32. On the leading side 40 of the jaw 28, a second protrusion 42 projects laterally outwardly from the longitudinal axis 32, the protrusions 36 and 42 having a common forwardmost edge 44 across the toe 34 which recedes as the trailing protrusion 36 is approached. As perhaps illustrated best in FIG. 6, the bulbous toe 34 is skewed with respect to the longitudinal axis 32 such that an axis 46 through the lateralmost points of the protrusions 36 and 42 is disposed in oblique relationship to the longitudinal axis 32.

Figure 3:
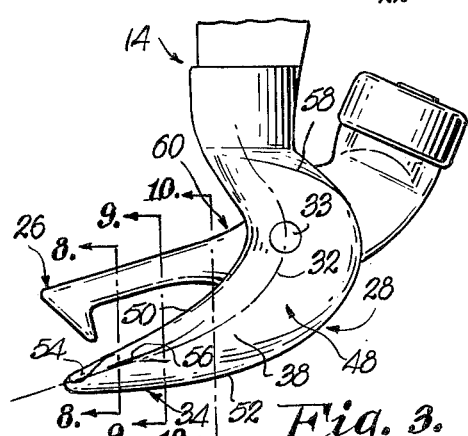
FIG. 3 is an elevational view of the trailing side of the hook, illustrating the movable jaw slightly open.
Figure 4:
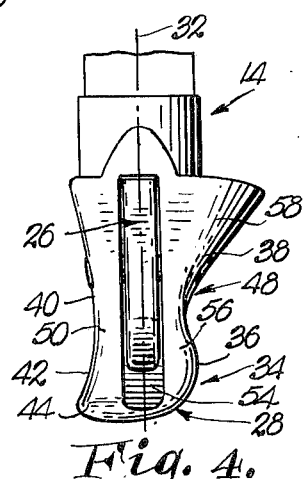
FIG. 4 is a second front elevational view of the hook slightly elevated with respect to FIG. 2.
Figure 5:
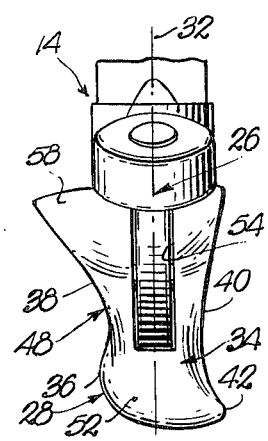
FIG. 5 is a rear elevational view thereof.

Immediately behind the toe 34 is a neck 48 that is transversely constricted such that its lateral extremes terminate inboard of the corresponding lateral extremes of the protrusions 36 and 42. Note that the leading side 40 is longitudinally concave from the protrusion 42 rearwardly to the neck 48 for a reason which will hereinafter become apparent. It is significant also to point out, as shown well in FIGS. 3 and 6, that while the protrusions 36 and 42 do extend laterally outwardly substantially beyond the neck 48, the oblique, skewed disposition of the protrusions 36 and 42 does not permit their lateral extremes to exist at the same point along the longitudinal axis 32. That is, at the point along axis 32 where the protrusion 42 protrudes outwardly the farthest, the protrusion 36 is very narrow. Similarly, where the protrusion 36 protrudes outwardly the farthest, the protrusion 42 is considerably withdrawn laterally.

The lower jaw 28 has upper and lower surfaces 50 and 52, respectively, which converge as the forwardmost edge 44 is approached, the upper surface 50 being longitudinally concave, and the lower surface 52 being longitudinally convex. Such convergence, in conjunction with the skewed disposition of the protrusions 36 and 42, keeps the circumference of the toe 34 from the neck 48 to the edge 44 no greater than its circumference at neck 48, notwithstanding the bulbous nature of the toe 34. Hence, although the substantial benefits of having the toe 34 bulbed are obtained by this construction, there is no interference with free stripping of the loop 24 off the hook 14 at that critical stage of the knotting cycle.

The upper surface 50 is provided with a longitudinal slot 54 for the jaw 26 which extends rearwardly from forwardmost edge 44 to a point beyond the neck 48. On the trailing side 38 of the jaw 28, the upper surface 50 and the protrusion 36 cooperate to define an uppermost ledge 56 which extends laterally outwardly a substantial distance from the slot 54. As illustrated in FIG. 2, such ledge 56 is instrumental in supporting the pigtail ends 20a and 22a of strands 20 and 22 after such ends have been severed from the device 16.

Rearwardly and above the neck 48 is a flare 58 on the trailing side 38 of the jaw 28, such flare 58 cooperating to define what may be termed a transverse crotch 60 in the hook 14 around which the twine loop 24 is wrapped during the knotting sequence. Note that the crotch 60 encircles the entire hook 14 and includes the proximal areas of the swingable jaw 26 as well as the neck 48 of the stationary jaw 28.

In use, it has been found that without the pronounced leading protrusion 42 and the concave leading side 40 which extends rearwardly to the neck 48, the twine strands 20 and 22 have a tendency to locate themselves far out along the leading side 40 toward the edge 44 during the knotting sequence. Consequently, they become rather easily pulled in under the swingable jaw 26 at a time when it is supposed to be clamping only the pigtail ends 20a and 22a against the stationary jaw 28. This forms a bulge or accumulation which the loop 24 cannot easily be stripped over as the loop 24 is pulled off the hook 14. Therefore, the tendency is for the loop 24 to simply push the pigtail ends 20a and 22a out from under the jaw 26, to the end that a knot is never formed and the bale fails to be tied.

Figure 6:
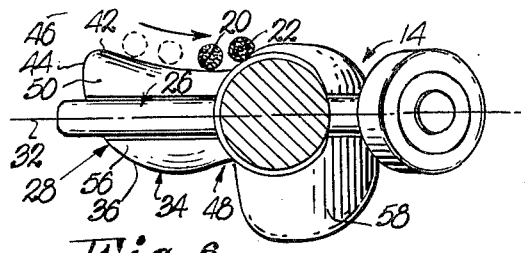
FIG. 6 is a top plan view of the hook, illustrating the way in which the strands are urged back toward the neck of the lower, stationary jaw.

On the other hand, with the protrusion 42 disposed as illustrated and the leading side 40 given a longitudinally concave illustrated and the leading side 40 given a longitudinally concave character, the twine strands 20 and 22 are urged rearwardly into the neck 48 and the twine holding crotch 60, as illustrated graphically in FIG. 6. With such an arrangement there is little tendency for any portions of the strands 20 and 22 other then the pigtail ends 20a and 22a to be pulled and clamped under the jaw 26, all to the end that the loop 24 is relatively unimpeded in its stripping movement off the hook 14.

The presence of the ledge 56 is quite significant because that structure also contributes substantially to the reliable, trouble-free stripping of the loop 24 off the hook 14 and over the retained pigtail ends 20a and 22a. As can be noted clearly in FIG. 2, the pigtail ends 20a and 22a present a sizable obstruction to the loop 24 during its movement off the hook 14. Through the presence of the ledge 56, however, this obstruction is overcome as the ledge 56 supports the pigtail ends 20a and 22a and literally cams out the loop 24 around such ends as the loop 24 is stripped off the hook 14. Note that as the loop 24 moves forwardly along the hook 14 from crotch 60, it must necessarily bulge slightly in the trailing direction because of the presence of the trailing protrusion 36 and ledge 56. Hence, the pigtail ends 20a and 22a supported on top of the ledge 56 are easily passed over by the deformed loop 24 instead of being pushed out from under the jaw 26. Consequently, the pigtail ends 20a and 22a remain under the jaw 26 in the intended manner and the knot is properly formed.

Significant here also, however, is the fact that although the loop 24 is bulged laterally in the above-described manner, such action does not enlarge the overall diameter of the loop 24, which would be highly undesirable. Instead, the loop length necessary to accommodate the deformation is acquired by the convergence of upper and lower surfaces 50 and 52 which permits the swingable jaw 26 to converge toward the lower surface 52 as the front edge 44 is approached. Accordingly, the circumference of the loop 24 need not enlarge beyond its dimensions when in the crotch area 60.

Moreover, while the loop 24 initially tends to be stripped along the longitudinal axis 32 of the jaw 28, when it reaches approximately the trailing protrusion 36, it tends to thereafter be stripped generally along the axis 46, this reducing any tendency for the loop 24 to expand, inasmuch as the forwardmost edge 44 and the leading side 40 converge as the leading protrusion 42 is approached.

It is to be emphasized that this ability to provide rapid, trouble-free stripping of the loop 24 without expanding the overall circumference of the loop 24 results not only in improved performance at the time of knot formation, but also improved reliability once the knot has been tied and the bale discharged from the machine. By not forcing the loop 24 to expand, a very strong, tight knot can be formed which will withstand the substantial strains placed upon it by the highly compressed materials in the bale and the rough handling to which the bale may be subjected. If the resultant knot is so loose that the pigtail ends 20a and 22a can slip through the loop 24 at the slightest bit of rough handling, it is no better than having the knotting mechanism simply fail to tie the knot in the first place. Thus, the formation of a small, tight knot which is highly resistant to having its pigtail ends pulled loose once the knot is properly tied forms an important aspect of this invention.

Having thus described the invention, what is claimed as new and desired to be secured by Letters Patent is:

1. In a bill hook having prolonged stationary and movable jaws which are cooperable during rotation of the hook to tie a knot in a pair of adjacent strands, the improvement comprising:

a transversely bulbous toe on said stationary jaw; and a transversely constricted neck on said stationary jaw immediately behind said toe, said stationary jaw having a longitudinally concave, normally upper surface and a longitudinally convex, normally lower surface, said surfaces converging as the toe is approached, said toe protruding laterally outwardly in opposite directions from said neck and being skewed with respect to the longitudinal axis of the jaw, having a trailing protrusion on the trailing side of the jaw set back with respect to a leading protrusion on the leading side of the jaw, said protrusions having a common, transversely rounded, forwardmost edge which recedes as the trailing protrusion is approached, the circumference of said stationary jaw from said neck to said forwardmost edge being at least as small as its circumference at said neck notwithstanding said bulbous configuration of the toe.

2. In a bill hook as claimed in claim 1, wherein said stationary jaw is provided with a longitudinal slot in said surface extending rearwardly from said forwardmost edge to a point beyond said neck, said upper surface in the area of said trailing protrusion presenting a strand supporting ledge that extends substantially laterally outwardly from said slot.

3. In a bill hook as claimed in claim 1, wherein said leading side of the stationary jaw is longitudinally concave from said leading protrusion rearwardly to at least said neck.

4. In a bill hook as claimed in claim 3, wherein said stationary jaw is provided with a longitudinal slot in said upper surface extending rearwardly from said forwardmost edge to a point beyond said neck, said upper surface in the area of said trailing protrusion presenting a strand supporting ledge that extends substantially laterally outwardly from said slot.

* * * * *